(12) United States Patent
Herrick

(10) Patent No.: US 8,064,737 B2
(45) Date of Patent: Nov. 22, 2011

(54) SPATIAL BANDWIDTH IMAGING OF STRUCTURAL INTERIORS

(75) Inventor: David L. Herrick, Mont Vernon, NH (US)

(73) Assignee: Herrick Technology Labs Inc., Manchester, NH (US)

( * ) Notice: Subject to any disclaimer, the term of this patent is extended or adjusted under 35 U.S.C. 154(b) by 924 days.

(21) Appl. No.: 12/046,847

(22) Filed: Mar. 12, 2008

(65) Prior Publication Data

US 2008/0317277 A1 Dec. 25, 2008

Related U.S. Application Data

(60) Provisional application No. 60/906,384, filed on Mar. 12, 2007.

(51) Int. Cl.
*G06K 9/00* (2006.01)

(52) U.S. Cl. .................. 382/312; 382/291; 382/295

(58) Field of Classification Search .................. 382/291, 382/295, 312
See application file for complete search history.

(56) References Cited

U.S. PATENT DOCUMENTS

| | | | | |
|---|---|---|---|---|
| 7,200,492 | B2 * | 4/2007 | Hassan et al. | 702/6 |
| 7,272,504 | B2 * | 9/2007 | Akimov et al. | 702/9 |
| 7,283,910 | B2 * | 10/2007 | Hassan et al. | 702/6 |
| 7,295,928 | B2 * | 11/2007 | Hassan et al. | 702/9 |
| 7,647,182 | B2 * | 1/2010 | Hassan et al. | 702/6 |

\* cited by examiner

*Primary Examiner* — Yosef Kassa
(74) *Attorney, Agent, or Firm* — Davis & Bujold, P.L.L.C.

(57) ABSTRACT

Spatial bandwidth imaging of the interior spaces and elements of a structure by transmission of low frequency, continuous-wave, narrow band signal or signals through the structure, measurement of the electric and magnetic components of the received signal received by narrow band Doppler or focused synthetic aperture methods over a range of signal paths extending from the transmitter and through the structure, and imaging of the effects of the interior space on the electric and magnetic components of the received signal.

2 Claims, 16 Drawing Sheets

Medical X-ray Tomography Analogy

Figure 1 - Medical X-ray Tomography Analogy

Figure 3 - Back Scatter Doppler Curves

Figure 4 - Forward Scatter Example

Figure 6 - Model Geometry

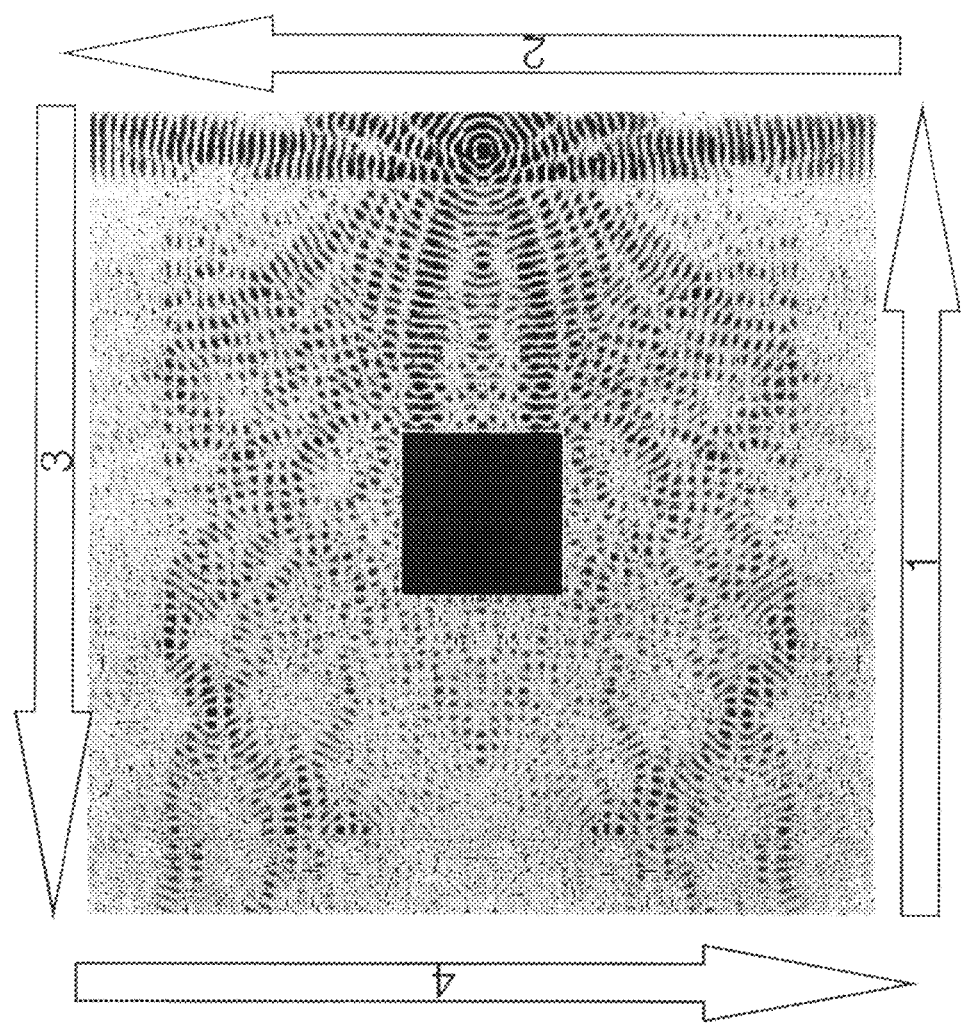
Figure 9 - Sample the Steady State Fields Around the Perimeter

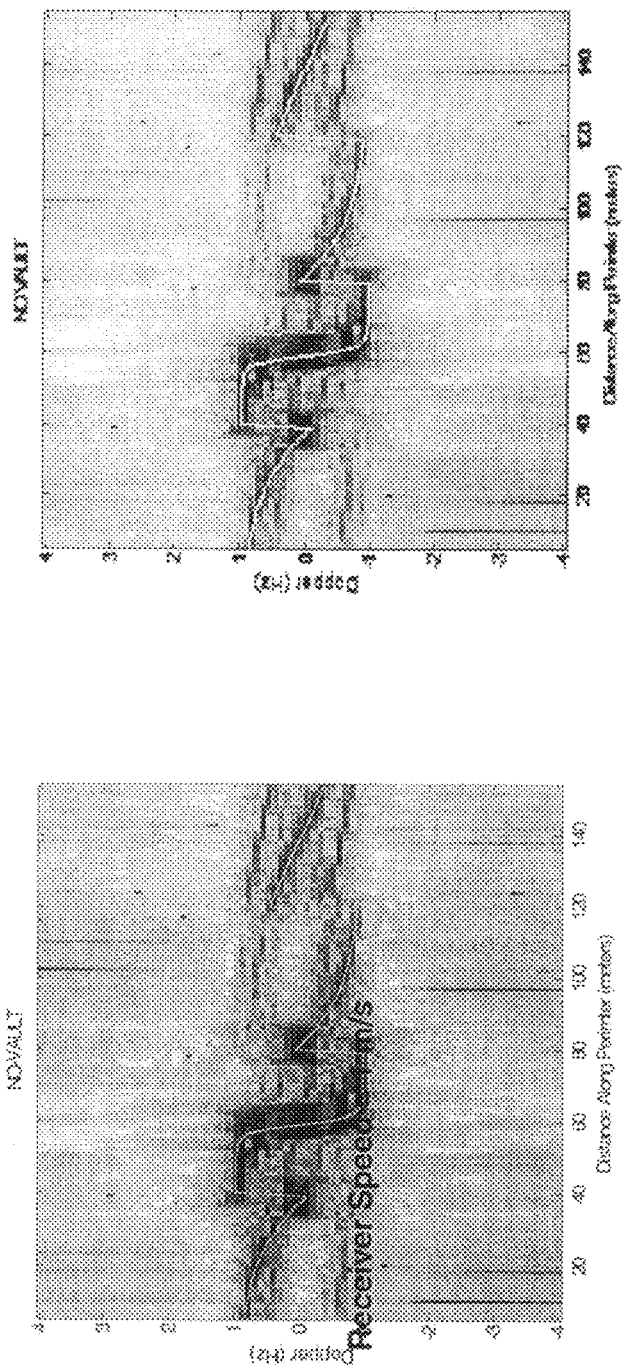
Figure – 11a Doppler Spectrum Along Perimeter With no Vault

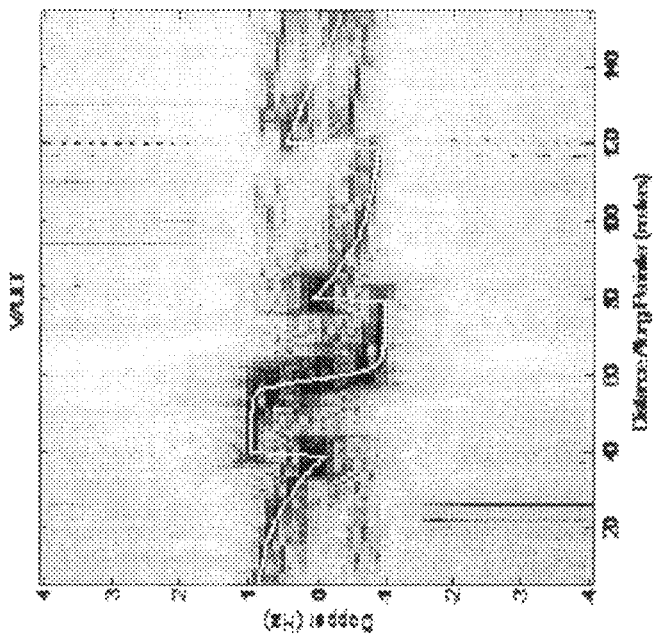
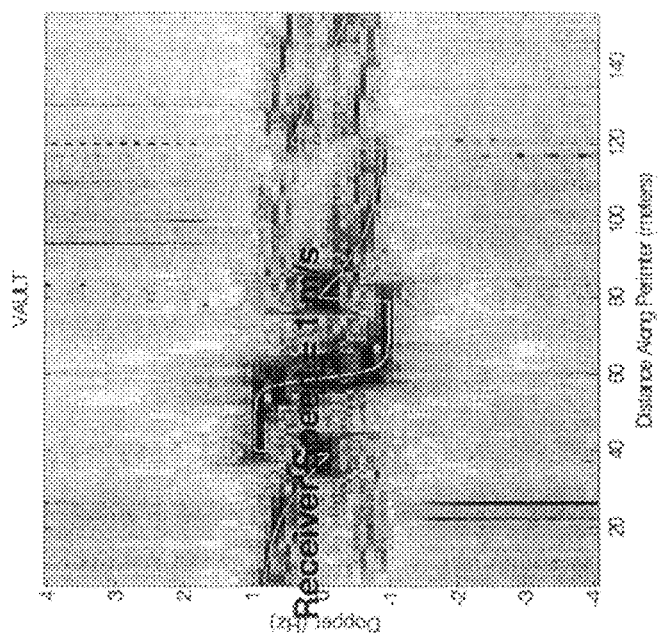
Figure – 11b Doppler Spectrum Along Perimeter With Vault

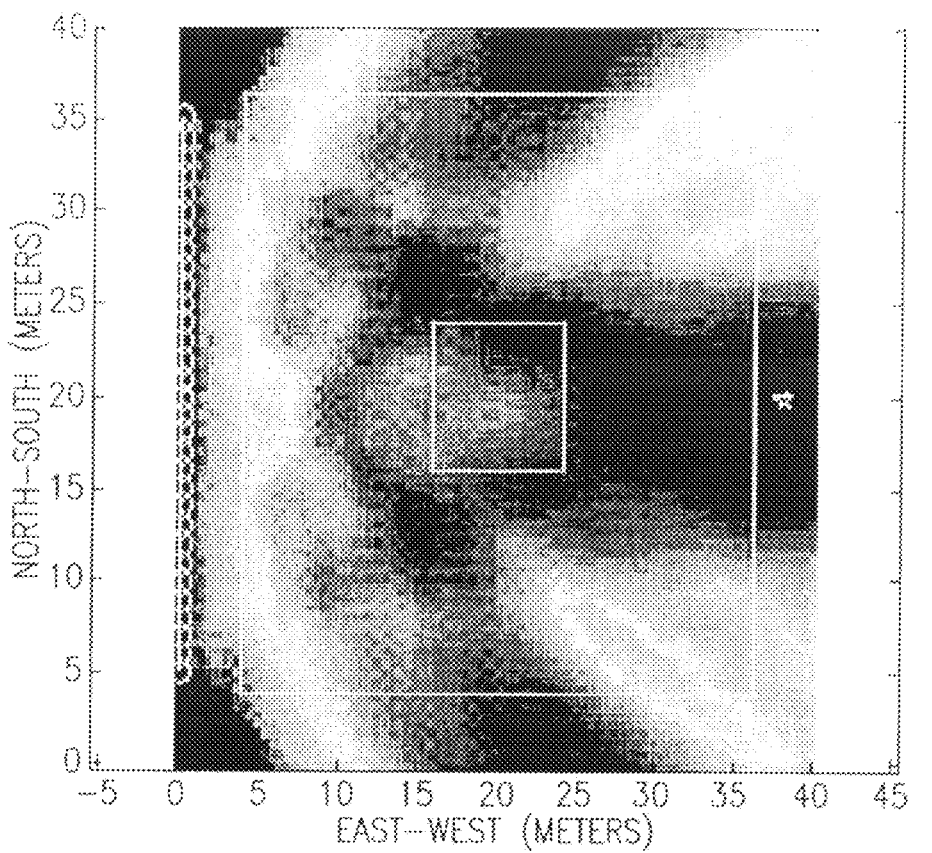
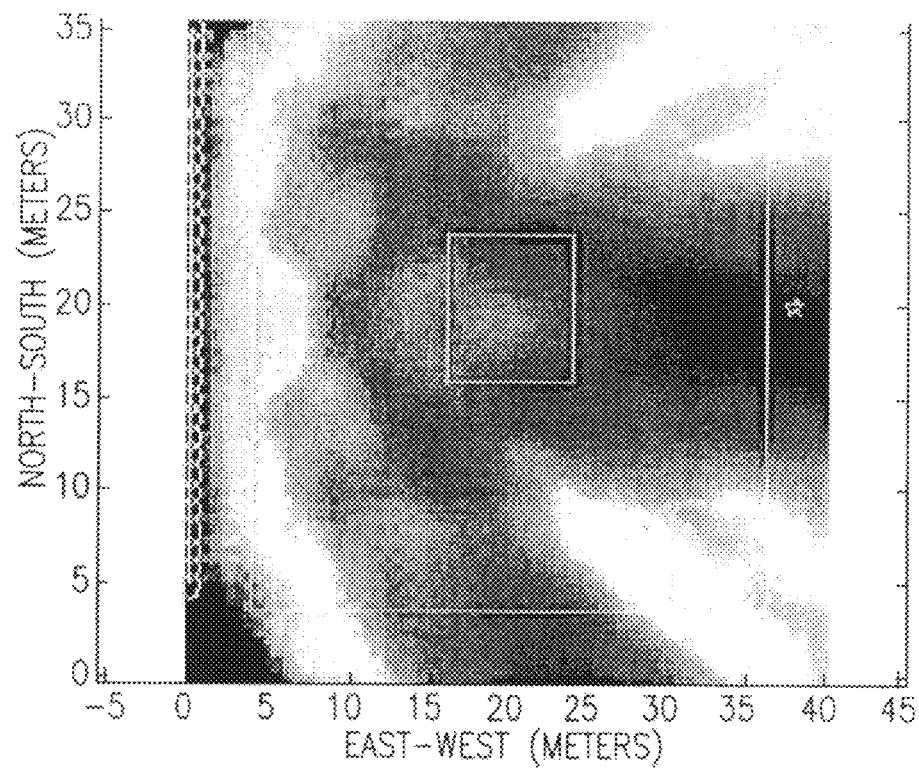
FIG.12b

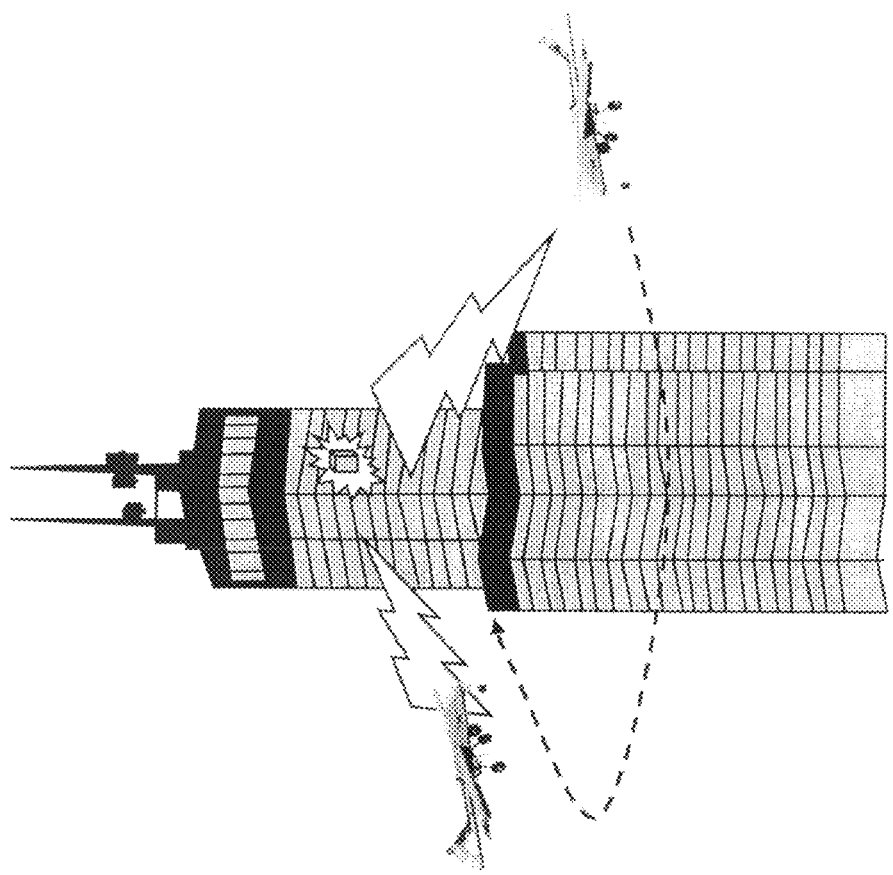
Figure 13 - Micro UAV 3D Blueprinting Application

SPATIAL BANDWIDTH IMAGING OF STRUCTURAL INTERIORS

FIELD OF THE INVENTION

The present invention is directed to a method and apparatus for spatial bandwidth imaging of structural interiors by measurement of Doppler, phase and amplitude components of backscatter, direct and diffracted narrow band signals.

BACKGROUND OF THE INVENTION

There is a need to be able to acquire image information representing the interior spaces of various forms of structures, including the interior structures, layout and contents of the structure and the spaces therein and wherein the structures may comprised of a variety of materials, including, for example, concrete, brick, steel, wood, rock and other earth materials, such as mud brick, artificial materials such as plastics, and so on.

There are, however, a number of problems with attempts to obtain such images due, for example, to the relative impermeability or opacity of the structural materials, interference from various sources and difficulties in obtaining image data having usable resolution or discrimination. For example, acoustic and visible or infra-red energy has often be used in listening systems to detect the effects of internal sounds on externally accessible portions of a structure, such as walls or windows. Such systems are not useful for imaging of internal spaces, however, because acoustic and visible or infra-red energy is readily blocked or absorbed by most building materials and is subject to interference from other energy sources, such as any source of extraneous noise or heat radiated from parts of the structure itself.

For these reasons, most more recent attempts at imaging the internal spaces of structures have employed ultra-wide band (UWB) radar systems, that is, systems that generate images from backscatter from an ultra-wide band signal in the radar frequency spectrums. Such systems are advantageous in that radio and radar frequency signals penetrate most structural materials more readily than do higher and lower frequency signals, thus allowing a stronger possible returned signal. In addition, the variation in the absorption, reflection and refraction characteristics of various materials is greater in the radar frequency spectrum than in higher or lower frequency spectrums, thereby providing greater possible discrimination between various materials.

It must be noted, however, that most typical building materials are still highly absorptive of radar and high frequency radio signals, and that the absorption of the signals increases with the signal frequency. The image resolution of such systems, however, is dependent upon the signal frequency components with higher resolutions requiring higher frequency signal components. For example, conventional radar frequency backscatter imaging systems transmit a series of radar frequency pulses wherein the image resolution is determined by the pulse width. Many current radar backscatter imaging systems, for example, provide an image resolution on the order of one meter, which results in a pulse having a lowest frequency component wavelength of one meter and significant higher frequency components that are multiples of the lowest frequency component.

In this regard, it must be noted that the number and amplitude of the higher frequency components increases rapidly as the pulse width decreases, so that current systems having at least currently acceptable image resolutions are ultra-wide band systems, that is, systems transmitting and receiving signals occupying very wide frequency bands. Ultra-wide band systems are disadvantageous in this regard, however, in that the blocking and absorption of the signal components by most conventional building materials increases rapidly as the frequency of the components increases. As a consequence, the effective range of such systems are typically very limited given the signal power achievable in reasonably portable systems.

In addition, and because ultra-wide band systems must receive signals over ultra-wide frequency bands, there is a significantly increased possibility that the system bandwidth will overlap one or more extraneous signals, such as signals from television stations and other radars, that may be at least as strong and often stronger than the backscatter return signal and that can seriously disrupt or degrade the received image data.

The present invention addresses these and other problems of the prior art.

DESCRIPTION OF THE DRAWINGS

The above discussed aspects of the prior art and the following discussed aspects of the present invention are illustrated in the figures, wherein:

FIG. 9 is a two dimensional representation of the computed E and H fields within the computation domain including the model structure of FIG. 6;

FIGS. 11A and 11B illustrate the Doppler spectrum of the received signal as the receiver traverses the path shown in FIG. 6 for the no vault and vault models;

FIGS. 12A and 12B illustrate a forward scatter signal image resulting from a receiver traversing only a path opposite the transmitter for the no vault and vault models;

Figure 1:
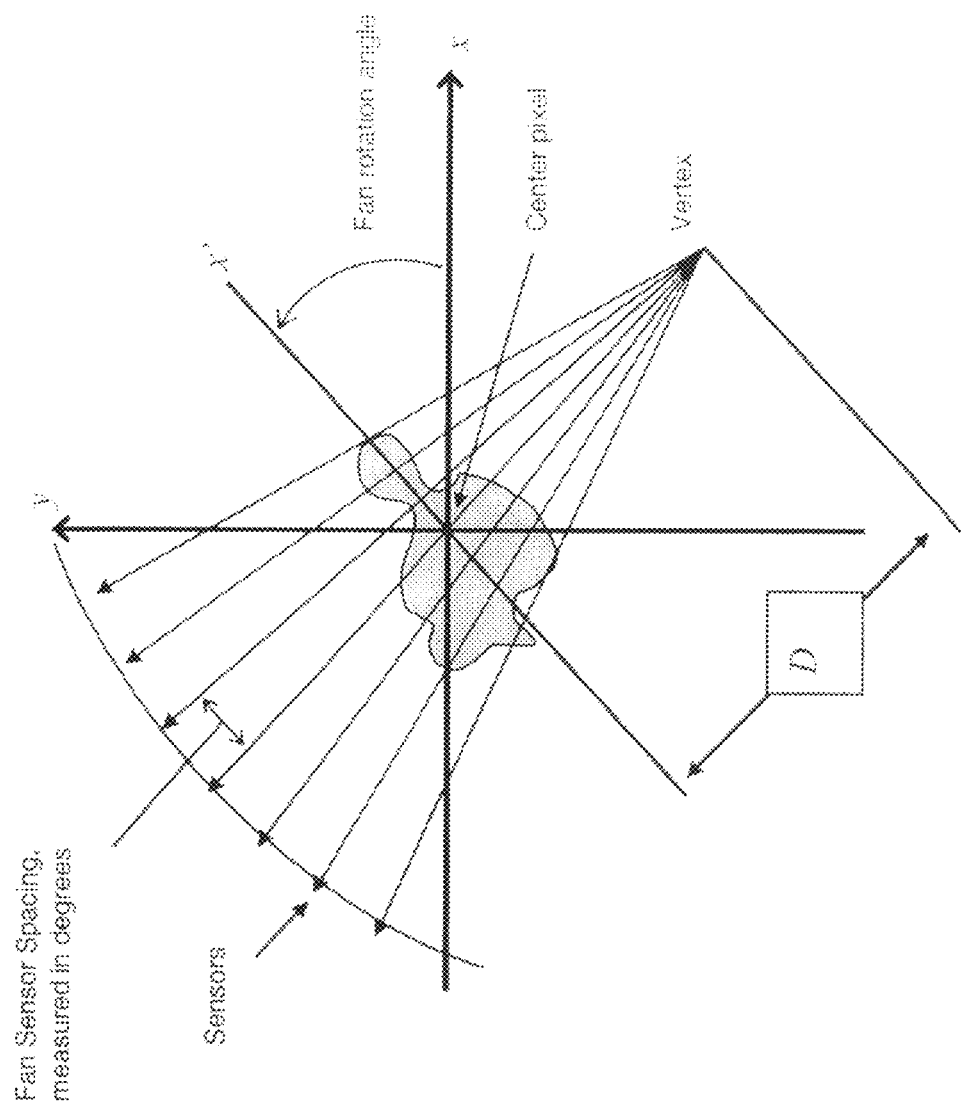
FIG. 1 is a diagrammatic illustration of the measurement of loss along a path of a transmitted signal due to absorption.

and,

FIG. 13 is a diagrammatic representation of a possible implementation of the present invention.

DESCRIPTION OF THE INVENTION

As described in the following, the method and apparatus of the present invention for imaging the interior spaces and elements of a structure transmits low frequency, continuous-wave, narrow band signal or signals through the structure, receives the signal or signals through a simple, high sensitivity narrow band receiver, and images the interior space according the effects of elements of the interior space on the electric and magnetic field components of the received signals. The transmitted signal may be, for example, a steady frequency or a narrow bandwidth signal and the frequency or frequency band of the narrow bandwidth transmitted signal is selected in part according to the qualities of the anticipated structural materials, to obtain acceptable penetration of the structure, and in part to avoid interference from extraneous signals, such as television and radar transmitters. A primary factor in selecting the transmitting signal frequency, however, is the desired image resolution of the structural interior spaces. For example, a transmitted signal having a wavelength of one meter will allow the interior space of the structure to be resolved to within one meter, that is, to provide an image resolution of one meter.

The present invention employs either Doppler or focused synthetic aperture methods to measure the electric and magnetic components of the received signal or signals over a range of signal paths extending from the transmitter and through the structure, hence the use of the term "spatial bandwidth" to described the method and system of the present invention. This information, in turn, allows the effects of the interior space on the electric and magnetic components of the received signal to be determined for each of the range of signal paths, which in turn and as described further in the following, allows the interior material or materials and structure or structures to be determined and imaged to within the resolution achievable with the wavelength of the narrow band signal and the ability of the method to discriminate between shapes and materials. Discrimination of the materials and shapes will also depend upon the reflective, refractive and absorptive effects of the materials and shapes on the electric and magnetic components of the transmitted signal, and the sensitivity of the system in detecting such effects.

Considering the effects of structural components and materials in further detail, it has been described herein above that the method and apparatus of the present invention generates an image of the interior spaces of a structure, that is, the interior structures and materials, by determining the absorptive, reflective and refractive effects of the interior structures and material on the electrical and magnetic fields of the transmitted signal over a range of paths through the structure and using Doppler or focused synthetic aperture methods.

Considering each of the effects, absorptive, reflective and refractive, that a material or structure can have on a signal, FIG. 1 is a diagrammatic illustration of the measurement of loss along a path of a transmitted signal due to absorption of the signal by an object or body in the signal path. This method is similar to that used in medical tomography, but medical tomography employs X-rays or a beam of neutrons while the present invention instead uses a narrow band RF or radar frequency signal. As shown, a signal is transmitted from a fixed location, that is, the vertex of a scanning arc, or fan, while a receiver moves along a radial arc on the opposite side of the object with the enclosed angle of the scanning arc and measures the amplitude and phase of the received signal at measurement points along the scanning arc. The amplitude of the received signal at each measurement point will be dependent upon the amount of transmitted signal energy absorbed by the object along the path from the vertex to the measurement point. The amount of transmitted signal energy absorbed will thus be a function of both the absorption of the object at the transmitted signal frequency along the transmission path and the thickness of the object material along that transmission path, and is illustrated for the simple case of an object of uniform absorbency.

It will be noted that in the illustrated case, that is, of a single transmission vertex and multiple measurement points along the measurement arc, the method will determine the amount of transmitted signal energy absorbed along the measurement path, but will not identify, for example, where along the path the absorption or any part of the absorption took place or, for example, the thickness of the object if the object is not of uniform absorbency. The resulting image is therefore one dimensional in that it will show location along the measurement arc and relative amount of transmitted signal energy absorbed. Further information representing, for example, the actual shape of the object and the relative absorbency of regions within the above can be elicited by multiple measurements taken using different vertex locations and corresponding different measurement marks to provide multiple cross sectional views through the region containing the object and the resulting image is therefore two dimensional.

Figure 2:
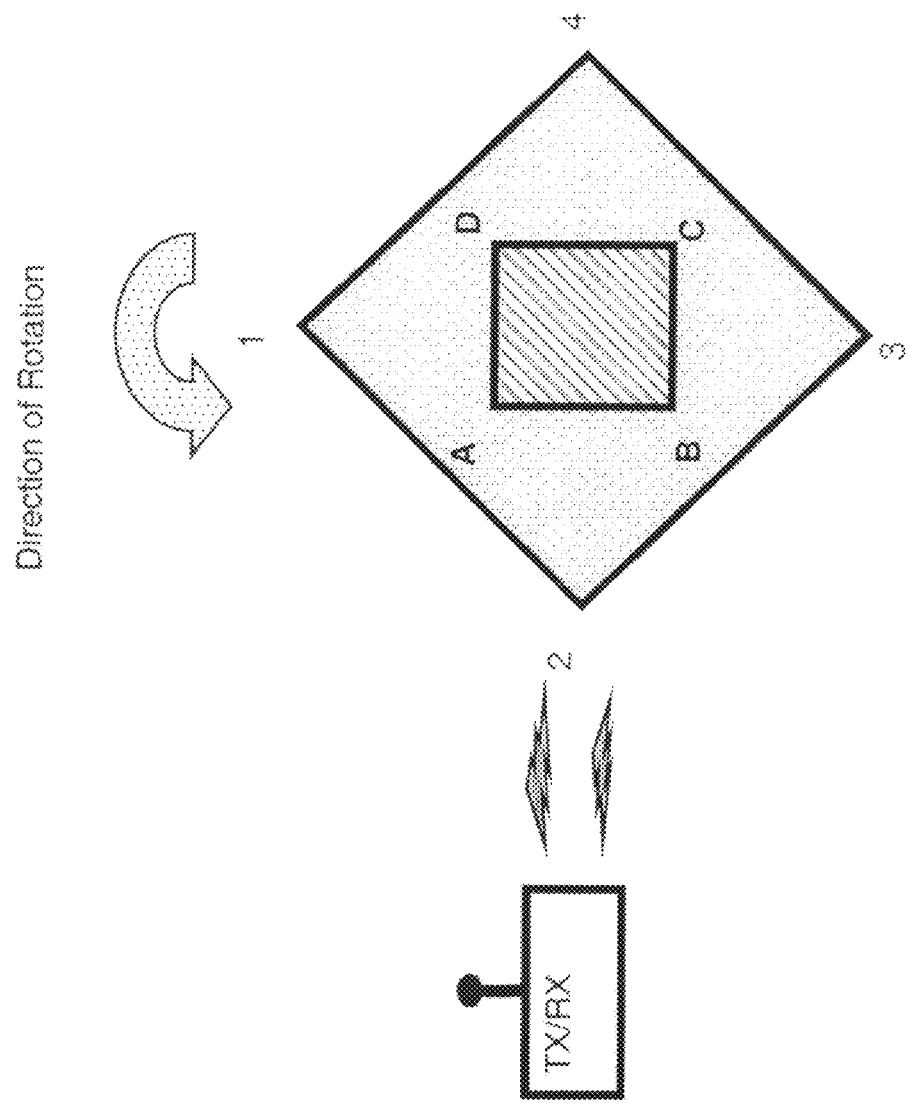
FIGS. 2 and 3 are diagrammatic illustrations of the measurement of the reflectivity of a body by measurement of backscatter.
Figure 3:
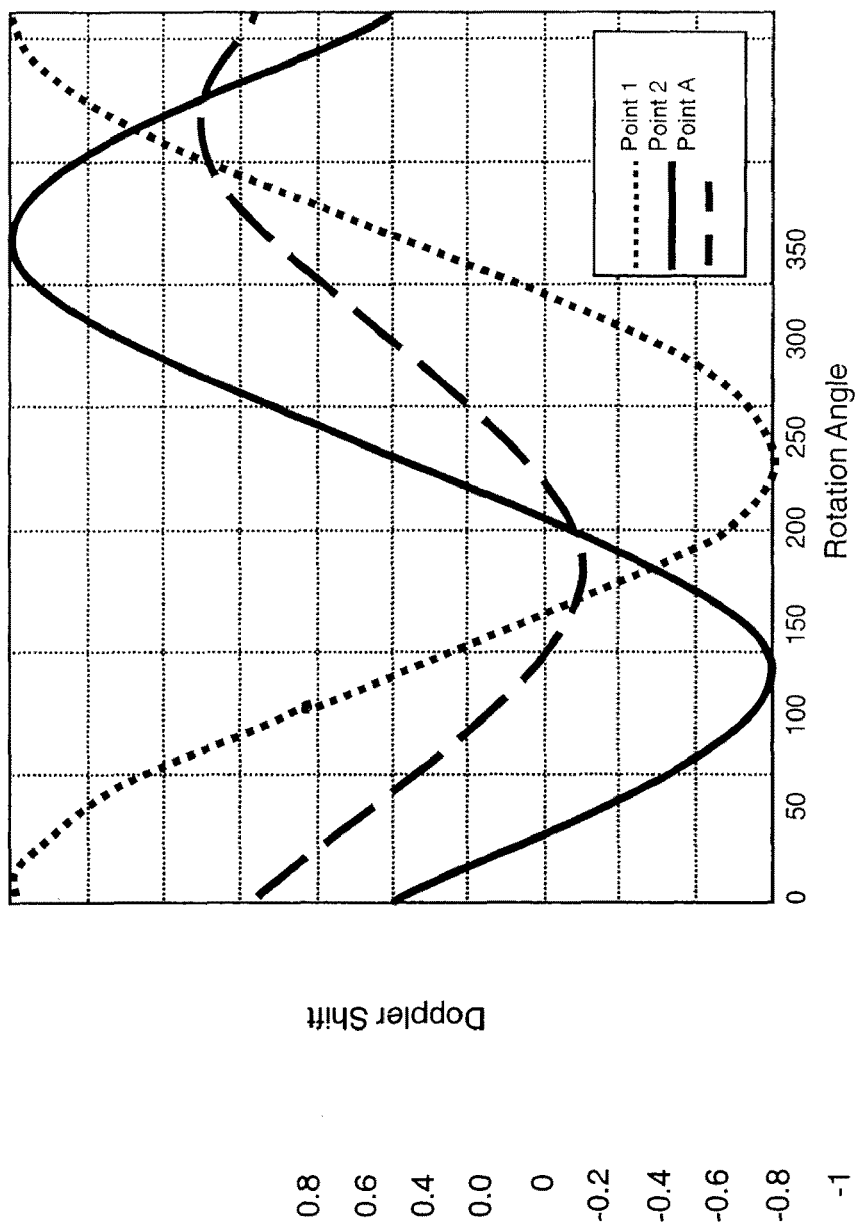

Next considering the effects of the reflective properties of structural elements or spaces, FIGS. 2 and 3 are diagrammatic illustrations of the measurement of the reflectivity of a body by measurement of backscatter, which is the reflection of a transmitted signal from the body. As illustrated in FIG. 2, the transmitter and receiver are located at the same point or, alternatively, the transmitter and receiver may be at different points in a general bistatic configuration. A signal is transmitted at the object across a scanning arc, and the amplitude of the returned, or backscattered, signal is determined at a number of measurement angles through the scanning arc. The amplitude and phase of the received signal at each measurement angle is indicative of the reflectivity of the object at that angle and the distance to the object, and is a function of such factors as the reflectivity of the object itself and the viewed shape of the object at that angle, such as the angle of a surface the signal is reflected from at that transmitting and receiving angle. It should also be noted that other object shape factors may effect the amplitude of the received signal, such as the tendency for the signal to be refracted around the object, which would appear as a difference in the reflectivity of the object at that angle. Also, and as in the above discussed illustration of the measurement of the absorbency properties of an object, the resulting image constructed from the amplitude and phase of the backscattered signal at each transmitting and receiving point is effectively two dimensional.

In a further implementation of the reflective measurement system represented in FIGS. 2 and 3, a relative movement between the object and the transmitter/receiver, such as a rotation of the object or the transmitter/receiver about an axis located at any point except at the transmitter/receiver will introduce a Doppler shift component to the signal reflected to the receiver from any point in the object, such as points 1-4, A, B, C and D in the object. The direction and magnitude of the Doppler shift component in the reflected signal from, for example, points 1-4, A, B, C and D, at any given time will be dependent upon the motion vector between the point and the location of the transmitter/receiver. For example, the reflected signal from points 1, A and D will be Doppler upshifted as these points are moving to approach the transmitter/receiver, while the reflected signal from points 3, B and C will be Doppler downshifted. In addition, the magnitude of the Doppler shift of the signals reflected from points 1 and 3 will be greater than those reflected from points A, B, C, and D because the magnitudes of the motion vectors between points 1 and 3 and the transmitter/receiver will be greater than those between points A, B, C and D and the transmitter receiver. The Doppler shifts in the signals reflected from points 2 and 4, however, will be essentially zero in both direction and magnitude as these points are effectively moving at right angles to the line between these points and the transmitter/receiver, so that there is no relative motion of these points toward or away from the transmitter/receiver.

The result of relative Doppler motion between the transmitter/receiver and the object is illustrated in FIG. 3 wherein it is shown that the Doppler shift components of the reflected signals from points 1 and 2 are offset, that is, are phase shifted by the apparent current angle between points 1 and 2, proportional to the angles and magnitudes of the velocity vectors of points 1 and 2 with respect to the transmitter/receiver. The Doppler shift component of the signal reflected from point A has an intermediate phase shift and intermediate amplitude with respect to those of points 1 and 2, reflecting the angle and magnitude of the velocity vector of point A with respect to those of points 1 and 2. It is therefore apparent that the added factor of Doppler shift information induced by relative motion of the object and the transmitter/receiver provides information regarding the locations of the points 1-4 and A, B, C and D relative to the location of the transmitter/receiver. It must also be noted that the Doppler shift for any given point of the object will vary with time, depending upon the relative motion of the transmitter/receiver and the object, so that the relative positions of the points in the object will be redefined continuously due to the relative motion of transmitter/receiver and the object. As a consequence, successive determinations of the relative positions of the points in the object at defined intervals will provide information allowing the location of each point in the object to be determined relative to all other points in the object.

Figure 4:
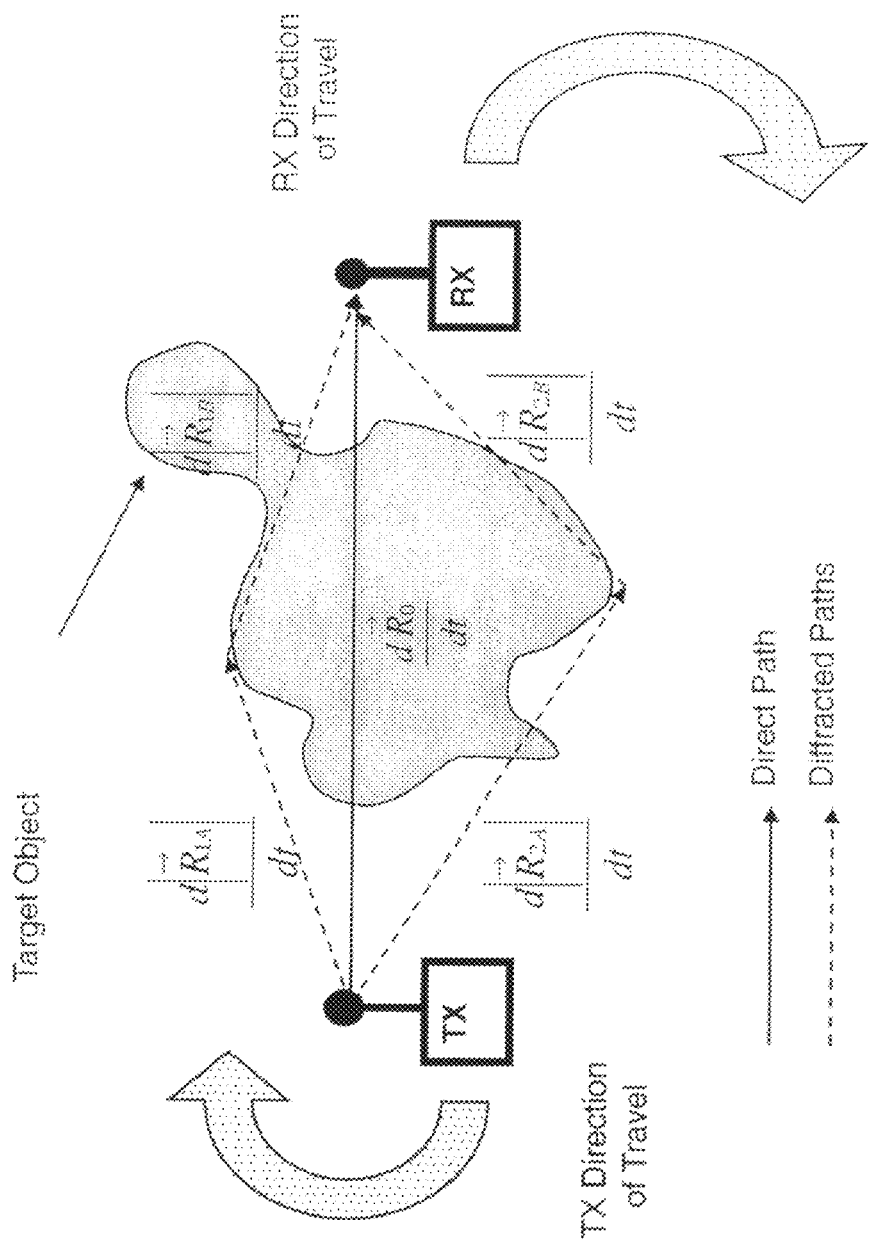
FIG. 4 is an illustration of the effects of refraction.

Referring now to FIG. 4, therein is illustrated the effects of refraction, also referred to as "forward scatter", upon a signal transmitted from a transmitter to a receiver located on the generally opposite side of the object so that there is a direct transmission path between the transmitter and the receiver through at least some part of the object.

It will be initially assumed that the object and the transmitter and receiver are at rest with respect to one another, that is, that there is no relative motion among the object and the transmitter and receiver. As such, there will be no Doppler shift introduced along any signal path between the transmitter and the receiver, so that a signal traveling along any path from the transmitter to the receiver will be effected only by the absorption and diffraction characteristics of the object.

In the instance of a signal following the direct transmission path between the transmitter and the receiver, therefore, the direct path signal will not be effected by the diffraction characteristics of the object because the angle of incidence of the signal through the object is effectively zero and diffraction is a result of a non-zero angle of incidence. As such, the direct path signal will arrive at the receiver at with a phase angle relative to the initially transmitted signal that is dependent upon the direct, straight line distance between the transmitter and receiver, including any propagation delays through the material of the object, and perhaps a decrease in amplitude resulting from the absorption characteristics of the object material.

All other transmission paths between the transmitter and the receiver, however, will be a result of the diffraction of the transmitted signal through the material of the object. That is, the signals traveling along the refraction paths will be transmitted at an angle relative to the direct path between the transmitter and the receiver and, as a result, will intersect the material of the object and will be refracted by the material of the object in such a manner as to arrive at the receiver. As indicated in FIG. 4, all of the refraction paths are longer than the direct transmission path due to the refraction by the material of the object and the signals will arrive at the receiver with a phase angle relative to the signal as transmitted that is dependent upon length of the refracted path between the transmitter and the receiver. The refracted signals may also suffer a decrease in amplitude due to absorption by the material of the object, and this decrease will be dependent upon the length of the diffraction path through the material of the object.

Accordingly, the relative phase of the received signal component with respect to other received signal components, such as the direct path signal component, is related to the angle of arrival of the received signal and thereby to the total length of the transmission path between the transmitter and the receiver and the amplitude of the received signal is at least in part related to the length of the path through the material of the object. The arrival phase angle and amplitude of a component of the received signal will thereby represent the length or thickness of a cross section of the object along the corresponding transmission path between the transmitter and the receiver, although it will not directly indicate the location of that cross section along the transmission path between the transmitter and the receiver.

Next considering an implementation of the refractive, forward scatter measurement system as represented in FIG. 4 wherein there is relative movement between any two of or all three of the transmitter, the object and the receiver, such as a rotation of the object about an axis or movement of the receiver along a defined path, such relative movement will again introduce a Doppler shift component to each refracted signal component. As discussed above, and assuming for example motion of the receiver along a path relative to the object for purposes of discussion, the direction and magnitude of the Doppler shift component in each refracted signal component at any given time will be dependent upon the relative motion vector between the refraction point of the signal component and the current location of the receiver. Again, the magnitude of the Doppler shift component will be a function of the current position of the refraction point relative to the direct path between the transmitter and receiver and the direction of the Doppler shift component will depend upon whether the current relative motion of the refraction point in toward or away from the receiver.

The relative directions and magnitudes of the Doppler shifts of the received refracted signal components will be represented by relative phase shifts between the received refracted signal components, thereby providing information, at each point in time, of the relative locations of the refraction points in the object. As described, the relative amplitudes of the received refracted signal components will indicate the length, or thickness, of the corresponding cross sections of the object traversed by the received refracted signal component in passing through the corresponding refraction point along the path between the transmitter and the receiver. The amplitude and Doppler phase shift information thereby allow the length and relative location of each refractive path cross section to be determined at any point in time.

In addition, the relative positions of the receiver and refraction points in the object will change over time with relative motion of the receiver and object, resulting in successively different relative locations of the refractive points and, as a consequence, successively different refractive transmission paths and corresponding refractive path cross sections to thereby define the shape and location of the object.

In summary, therefore, measurements of the amplitude and Doppler/phase relationships between narrow band signals transmitted from a transmitter and to a receiver through a space of interest, such as a structure, and arising from the absorptive, reflective and refractive properties of spaces and elements within the structure will allow the construction of a representation, or image, of the properties of the spaces and elements within the structure.

According to a presently preferred embodiment of the present invention, the amplitude and Doppler/phase information necessary to construct an image of the spaces and elements within the structure is obtained by a stationary or moving narrow band transmitter transmitting a signal having a wavelength proportional to the desired image resolution and a corresponding narrow band receiver moving along a predetermined path around the structure. The transmitted signal source may be, for example, the radiation field of a dipole antenna located nearby, or a plane wave arriving from any arbitrary direction, such as from an antenna located beyond the near field distance of the antenna.

In order to validate the method, the electric and magnetic fields within the computational domain, that is, within the two or three dimensional space containing the structure space and elements can be calculated, and the phase and amplitude characteristics of the received signals determined at points along the receiver path. In this regard, the computational domain is discretized into a two or three dimensional array of cells wherein the material properties within the computational domain can vary from cell to cell, thereby allowing modeling of forward and back scattering due to various structural elements, such as sheet-rock walls, metal walls and studs, metal, concrete or wooden structural elements, furniture and human bodies.

In the present case, the electric and magnetic fields resulting within the structural space from the transmitted signal are calculated using the finite-difference time-domain (FDTD) method, which is well known in the relevant fields of art. In brief, the FDTD method is a member of the general class of differential time domain numerical modeling methods wherein the differential form of Maxwell's equations are modified to central-difference equations and discretized and solved in a reiterative manner alternating between the electric and magnetic fields within the computational domain of interest.

In the differential form of Maxwell's equations the time derivative of the E (electrical) field is dependent on the Curl of the H (magnetic) field. This can be simplified to state that the change in the E field (the time derivative) is dependent on the change in the H field across space (the Curl). This results in the basic FDTD equation that the new value of the E field is dependent on the old value of the E field (hence the difference in time) and the difference in the old value of the H field on either side of the E field point in space. The H field is found in the same manner, wherein the new value of the H field is dependent on the old value of the H field (hence the difference in time), and also dependent on the difference in the E field on either side of the H field point.

Figure 5:
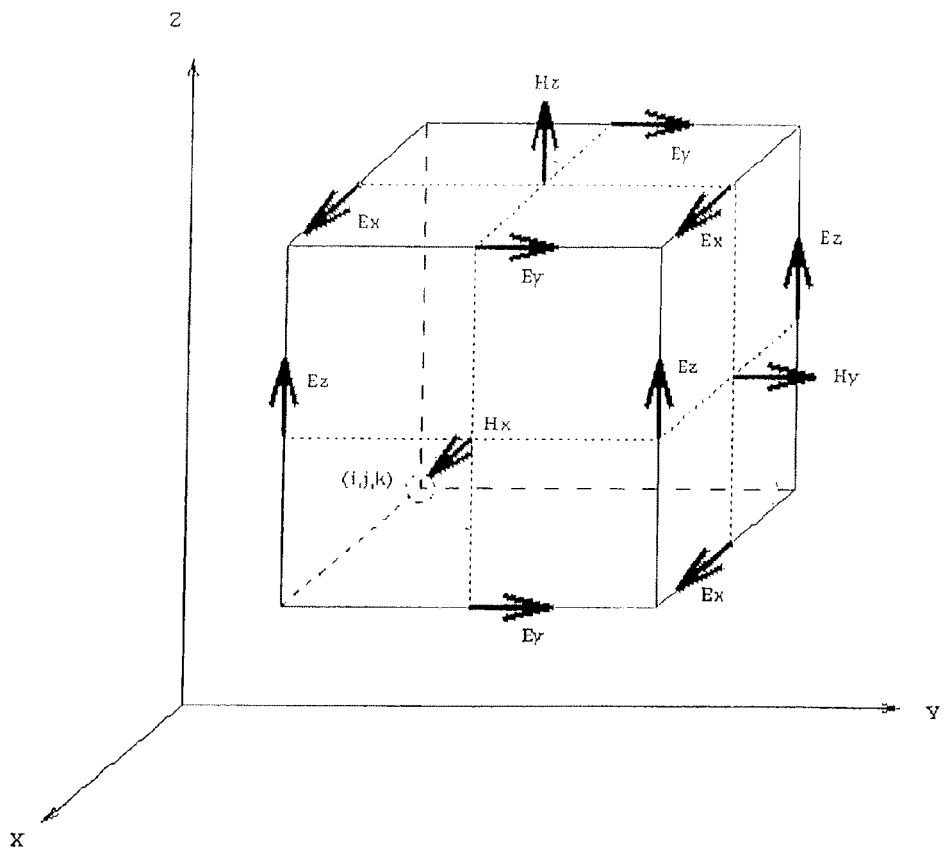
FIG. 5 is a diagrammatic representation of a cell of an FDTD computational domain.

In order to use FDTD a computational domain must be established wherein the computational domain is the discretized space, that is, the array of cells, where the calculation will be performed. In the usual implementation of the FDTD method the two or three dimensional region of interest is divided into "Yee Cells", as illustrated in FIG. 5. In the Cartesian coordinate system, each Yee cell contains six field components, Ex, Ey, Ez, Hx, Hy and Hz wherein the fields are all offset by half a space step, and the E and H fields are determined at every point within the computational domain.

The material of each cell within the computational domain must also be specified and, typically, the material will be either free-space (air), metal (perfect electrical conductors (PEC)), or dielectrics, any material can be used, as long as the permeability, permittivity, and conductivity can be specified.

It is also necessary to define a signal source which, for example, may be a dipole within the computation domain or a plane wave originating from a source outside the near field of the emitter.

The FDTD method directly determines the E and H fields at each cell, thereby allowing the E and H fields to be determined at any point or series of points within the computational domain. If, therefore, the path traversed by the receiver is contained within the computational domain, the E and H fields along the receiver path can be determined from the amplitude and Doppler/phase information extracted from the signals received from the transmitter.

In one implementation of the above methods of the present invention, the transmitted signals may be received and the amplitude and Doppler/phase information compared against selected scattering points within the computational domain, that is, for selected points within the structural space of interest, by line integration of Doppler/phase information over a predetermined receiver path or by focused synthetic aperture imaging. Both methods effectively allow the receiver to "focus" on selected points within the space of interest.

Figure 6:
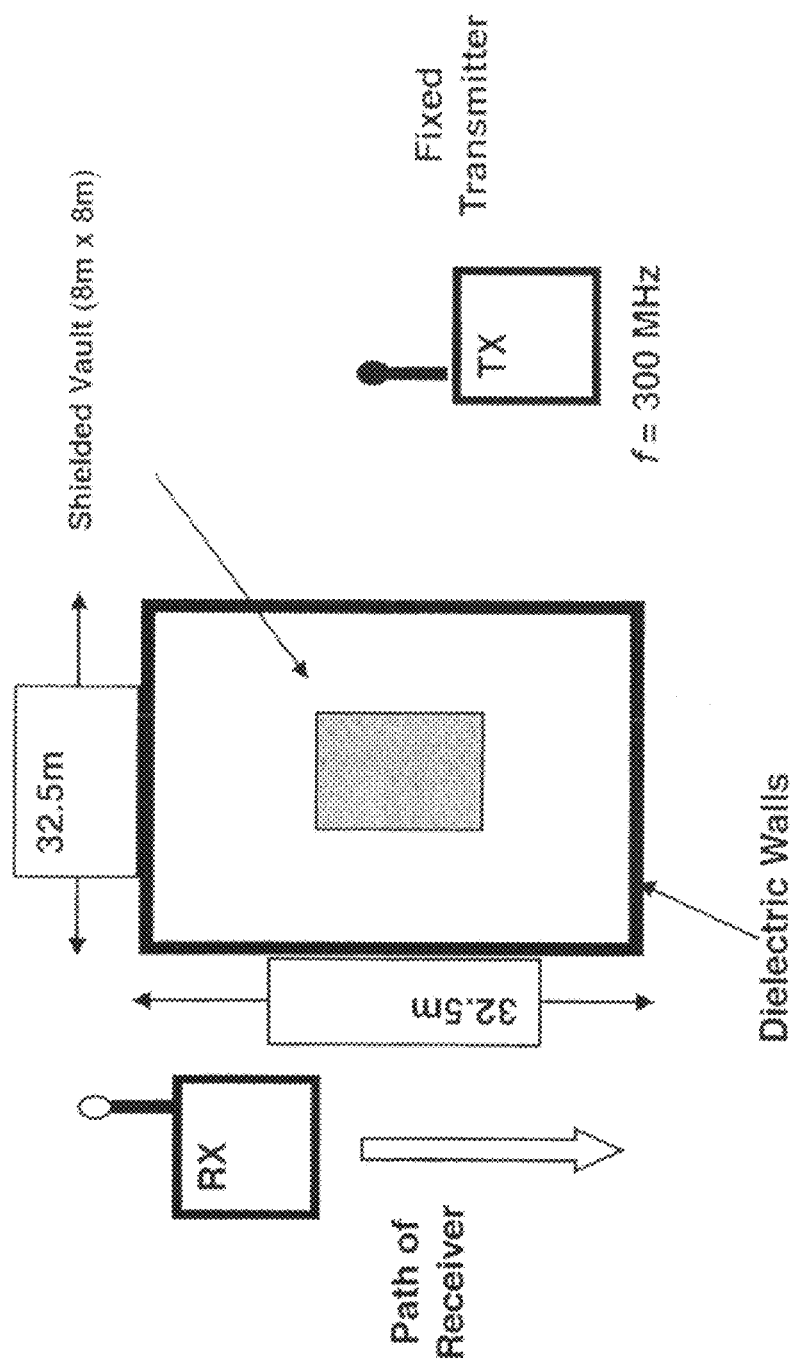
FIG. 6 is a diagrammatic representation of an exemplary model structure comprised of a shielded vault surrounded by outer walls comprised of a dielectric (non conducting) material.
Figure 7:
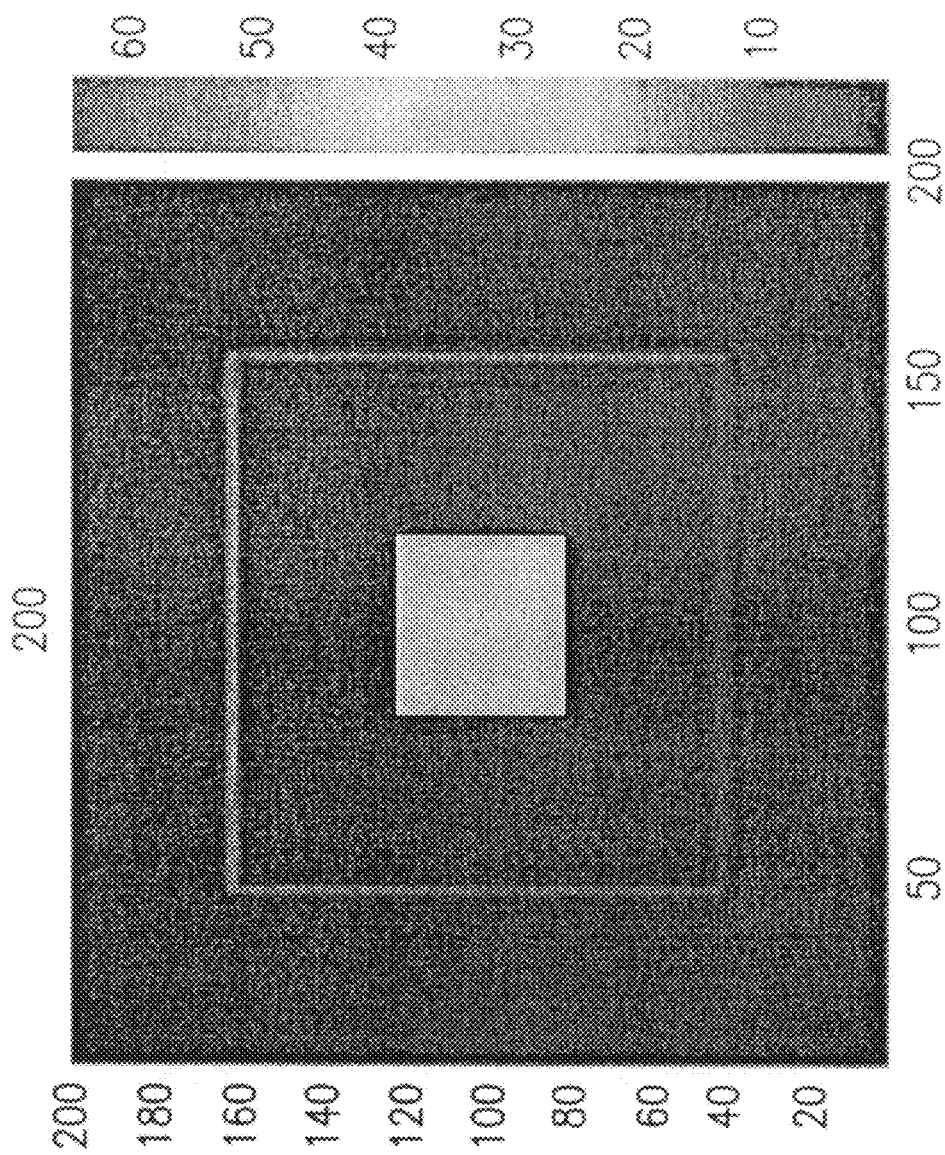
FIGS. 7 and 8 then illustrate results obtained by applying the FDTD method for an ultra-wide band transmitted signal and a narrow band transmitted signal.
Figure 8:
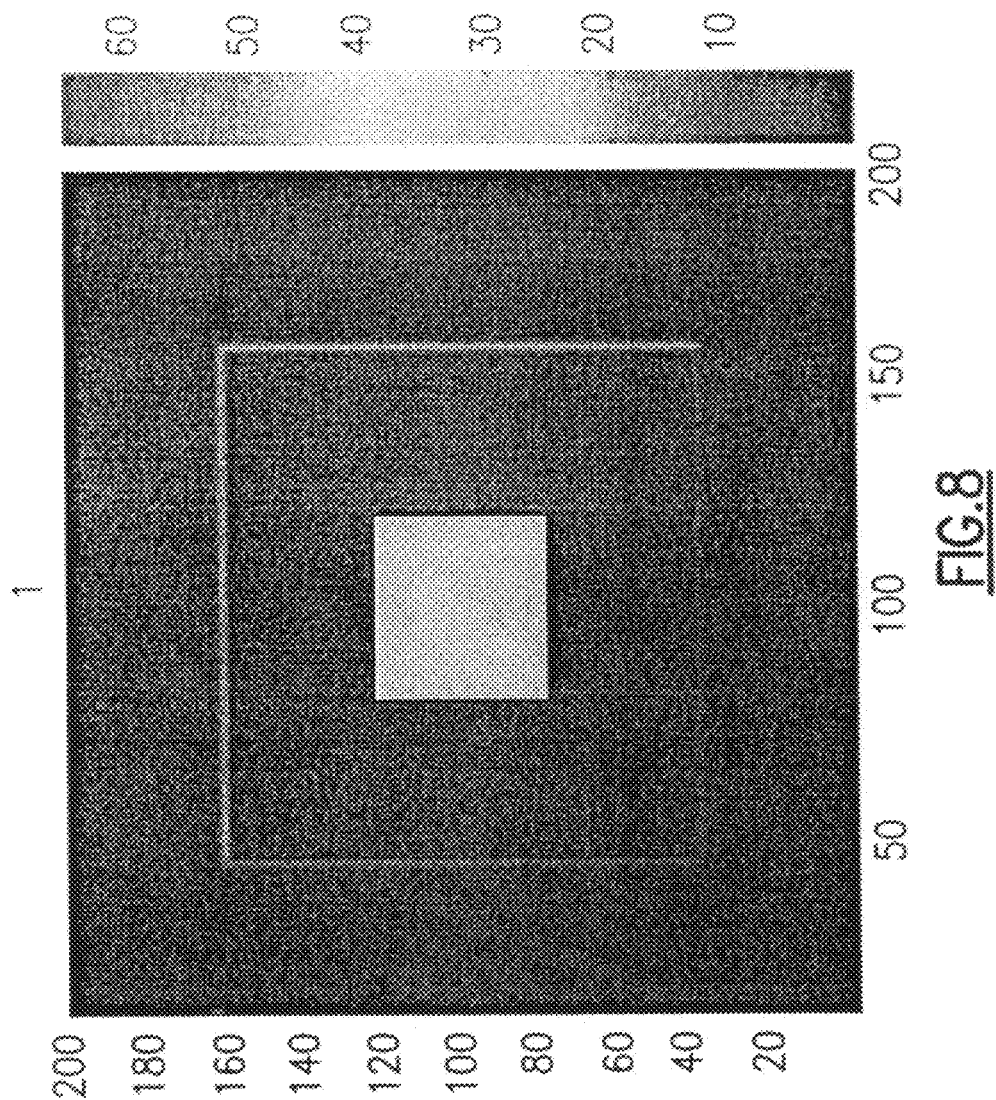

The above processes of the present invention are illustrated in FIGS. 6, 7, 8, 9, 10A-10D, 11A and 11B, 12A and 12B, and 13A and 13B wherein FIG. 6 is a diagrammatic representation of an exemplary model structure comprised of a shielded vault, such as a room with walls including a metallic or otherwise conductive material, surrounded by outer walls comprised of a dielectric (non conducting) material. FIGS. 7 and 8 then illustrate exemplary results obtained by applying the FDTD method for, respectively, an ultra-wide band transmitted signal and a narrow band transmitted signal, thus confirming the validity of the FDTD method for these purposes, regardless of the signal characteristics, and FIG. 9 is a two dimensional representation of the computed E and H fields within the computation domain including the model structure of FIG. 6.

Figure 10A:
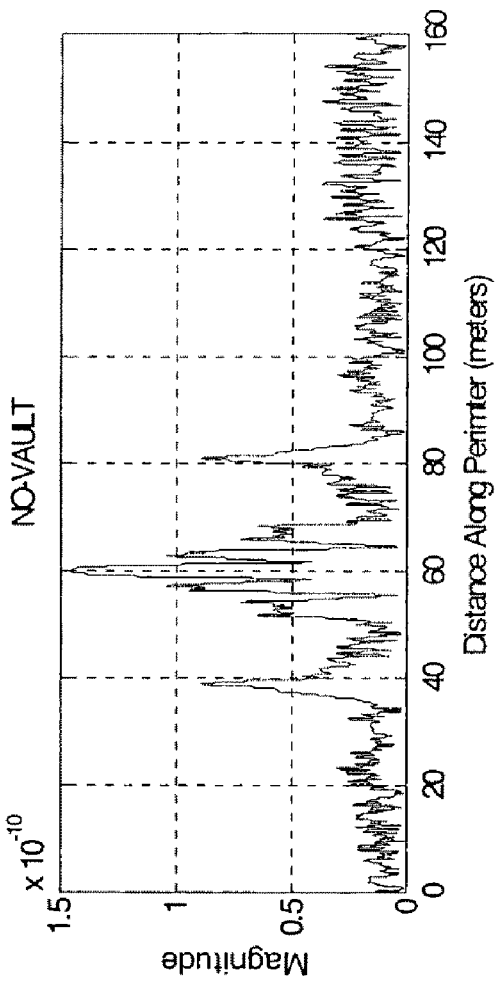
FIGS. 10A and 10B are illustrations of the received signal amplitude (magnitude) and relative phase for a receiver traversing the path indicated in FIG. 6, but for a model not including the inner vault shown in FIG. 6.
Figure 10B:
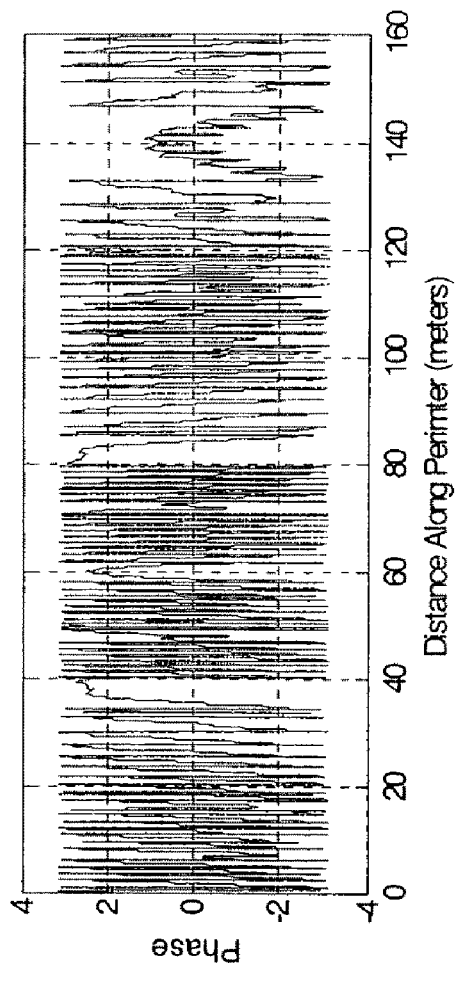
Figure 10C:
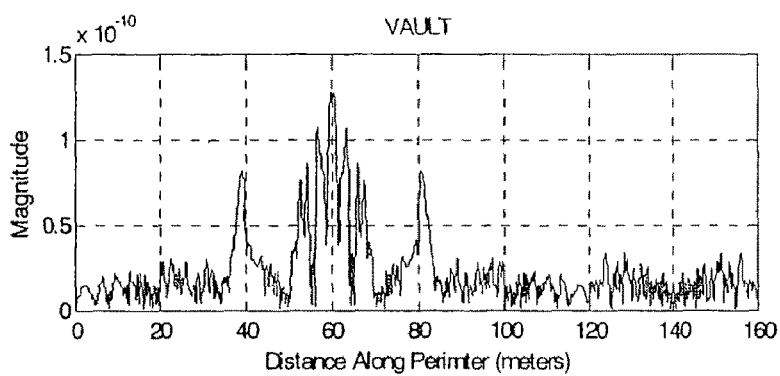
FIGS. 10C and 10D are illustrations of the received signal amplitude (magnitude) and relative phase for a receiver traversing the path indicated in FIG. 6, but for a model including the inner vault shown in FIG. 6.
Figure 10D:
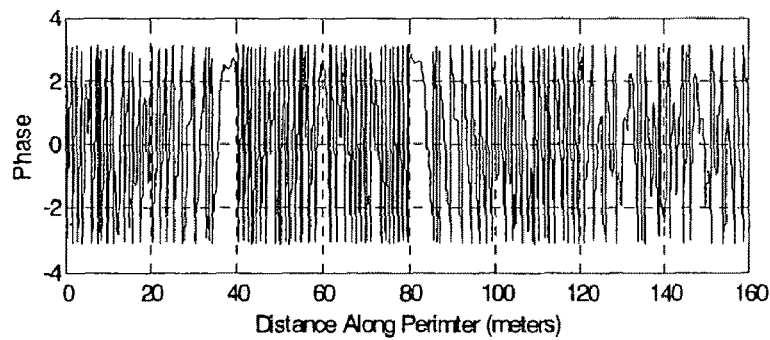
Figure 12A:
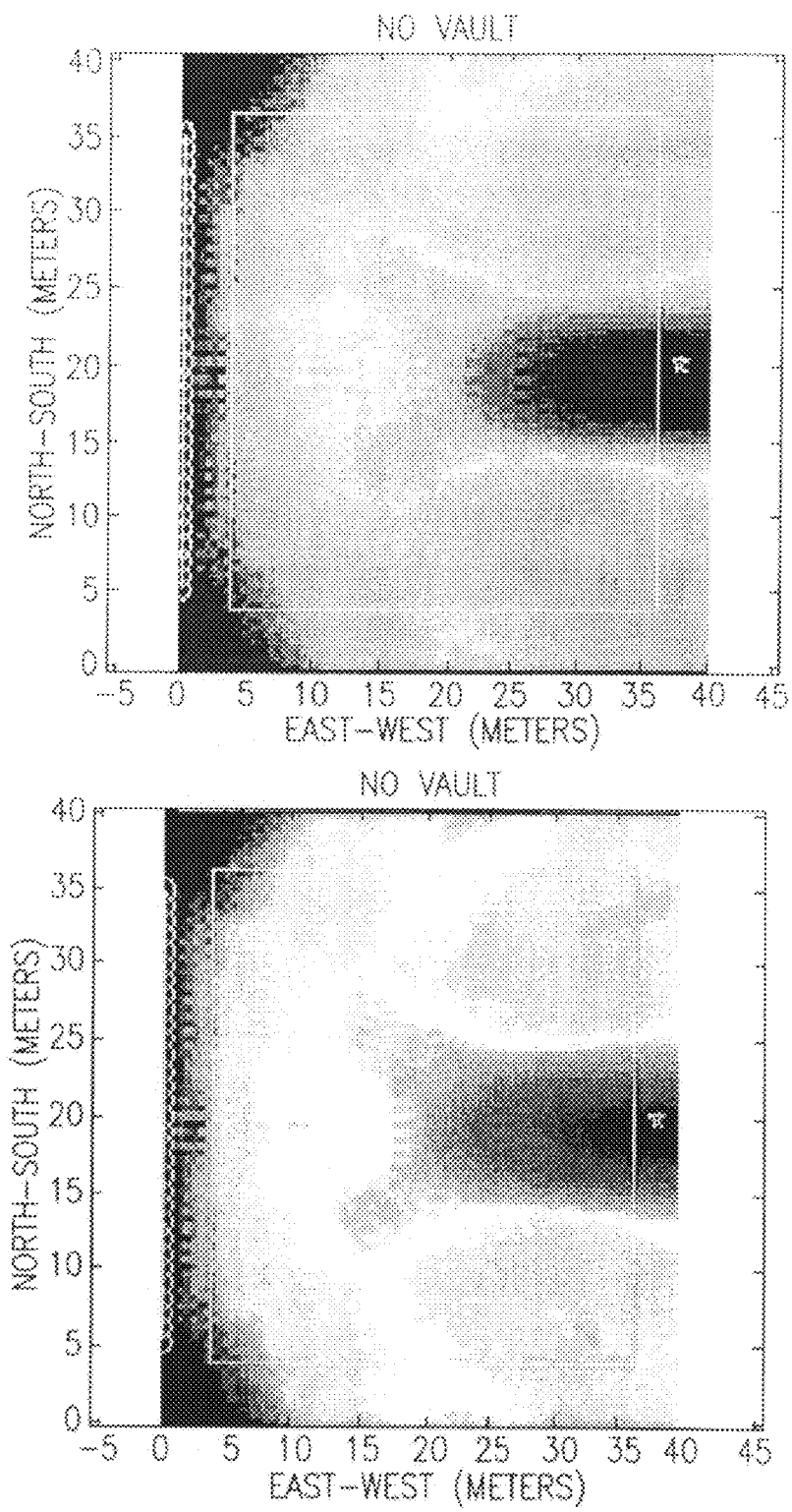

FIGS. 10A and 10B are illustrations of the received signal amplitude (magnitude) and relative phase for a receiver traversing the path indicated in FIG. 6, but for a model not including the inner vault shown in FIG. 6. FIGS. 10C and 10D are likewise illustrations of the received signal amplitude (magnitude) and relative phase for a receiver traversing the path indicated in FIG. 6, but for a model including the inner vault shown in FIG. 6, and the differences resulting from the presence or absence of the vault can be seen from a comparison of FIGS. 10A and 10B with the corresponding ones of FIGS. 10C and 10D.

FIGS. 11A and 11B, in turn, illustrate the Doppler spectrum of the received signal as the receiver traverses the path shown in FIG. 6 for both the no vault model, FIG. 11A, and the vault model, FIG. 11B. Again, the effects of the presence or absence of the vault in the space of interest is apparent from a comparison of FIGS. 11A and 11B.

It will be noted that in the above examples the receiver path traverses only the computation domain area directly opposite the transmitter. This is again illustrated in FIGS. 12A and 12B, which represent a forward scatter signal image resulting from a receiver traversing only a path opposite the transmitter and, respectively, for the no vault and vault models. In the no vault and fault models, a forward scatter signal image resulting from the receiver traversing a path includes not only the edge of the computational domain opposite the transmitter, but also the edges of the computational domain orthogonal to the edge opposite the transmitter, that is, the edges to either side of the computational domain. The image created from data obtained along both the opposing and orthogonal sides of the computational domain provide a significantly better delineation of the vault.

FIG. 13 is an illustration of an implementation of a system according to the present invention wherein the internal spaces and structures of one or more floors of a building are "illuminated" by a transmitter located, for example, on a floor above or below the floor of interest or, for example, on another building. The receiver is in turn mounted in a remotely controlled drone aircraft that is piloted to follow a course around the floor or floors of interest to receive the transmitted signal or signals and to re-transmit the signal or data to another site where it is processed to image the interior spaces of interest.

Lastly, as described above, the amplitude and Doppler/phase information of the transmitted signal may be received and extracted for selected points within the computational domain by, for example, line integration of Doppler/phase information over a predetermined receiver path or by focused synthetic aperture imaging. Both methods effectively allow the receiver to "focus" on selected points within the space of interest, that is, to determine the signal strength at scattering centers at selected points of interest.

First considering line integration of Doppler/phase information over a predetermined receiver path to determine the strength of a scattering center within the domain of interest, one implementation of the method of the present invention employs a receiving antenna and a transmitter wherein, for example, the receiver is mobile along a predetermined path generally opposite the transmitter with respect to the structure to be imaged. The transmitter and receiver employ, for example, rubidium oscillators, to maintain accurate frequency and phase relationships between the transmitted and received signals and GPS (global positioning system) methods to determine the locations of the transmitter and receiver. Movement of the receiving antenna along the scanning path and comparison of the transmitted and received signals thereafter allows the Doppler/phase shift of the transmitted signal along successive paths to the receiving antenna through successive cross sections of the structure and consequent imaging of the structure interior from the Doppler/phase information as described above.

Another implementation of the present invention using integration of Doppler/phase information employs two or more relatively closely spaced receiving antennas and GPS (global positioning system) methods to determine the locations of the transmitter and receivers. The transmitters and receivers again employ, for example, rubidium oscillators, to maintain accurate frequency and phase relationships between the transmitted and received signals, and a baseline phase measurement is obtained by comparing the received signal components at the receiving antennas.

Comparison of the relative phase relationships between the signals received at the two receiving antennas, which form a DF baseline, thereby allows system to determine a succession of DF lines from the known locations and orientations of the receiving antennas along the path traversed by the antennas to a signal emitting point, that is, to a point along a propagation path of the transmitted signal. This information will also yield the phase of the transmitted signal as received at each of the known points along the receiver path. Integration of the phase determination results along the line of the antenna path will thereby allow the location of the emitted signal within the space to be determined within a significant degree of accuracy. As a result, the system can identify, detect and extract signal components from selected signal emitting points within the structure of interest.

A third implementation of the method of the present invention using line integration of Doppler/phase information over a predetermined receiver path does not require rubidium oscillators, for example, to maintain accurate frequency and phase relationships between the transmitted and received signals. This implementation of the present method instead employs an array of two or more relatively closely spaced DF antennas and a more distantly spaced reference antenna.

The DF antennas are spaced sufficiently close to eliminate phase ambiguity at the highest frequency of interest, recognizing that the signal components received by the DF antennas from other points within the computational domain will most probably by correlated in the frequency ranges of interest. The reference antenna, however, is spaced apart from the DF antennas by a distance sufficient that, at the frequencies of interest, the signal components received by the reference antenna from points other than the selected point are decorrelated with respect to the direct arrival signal components received by the correlated DF antennas, recognizing that there will most probably be phase ambiguity between the signal components received by the reference antenna with respect to the signal components received by the DF antennas in the frequency range of interest.

A baseline phase measurement is then obtained by first individually comparing the received signal components at the correlated DF antennas with the received signal components at the reference antenna and then differencing the comparison between the first correlated DF antenna and the reference antenna and the comparison between the second correlated DF antenna and the reference antenna. The signal components received by the reference antenna are common to the two comparisons, so that the phases of the signal components received by the reference antenna will cancel out. In addition, the signal components received by the reference antenna are decorrelated from the signal components received by the correlated DF antennas, thereby causing the signal components from points other than the point of interest to "wash out". As a result, the system can detect and extract signal components from selected signal emitting points within an area of interest, such as the cells of a computational domain encompassing a structure of interest.

For example, and first considering the operation of the above system as a direction finding (DF) system, it will be seen from the above discussion that the system can determine a DF line to a signal emitting point, that is, the location of a cell along a propagation path of the transmitted signal, by determining the phase of the emitted signal at a given point along the receiver path, and may do so at a number of points along the receiver path by determining the signal phase at each point. Integration of the phase determination results along the line of the transmitter path will thereby allow the location of the emitted signal within the space to be determined within a significant degree of accuracy.

It will also thereby be seen that the system can be operated in "reverse" to select and receive the signal or signal emitted from selected points within the space of interest. That is, the relative phases of the received signal components at each point along the receiver path are related to the directions of the transmission paths between the signal emitting points and the current location of the receiver. The receiver can thereby identify and select the signal components arriving along a selected propagation path, which will be a line intersecting one or more signal emitting points within the space of interest, by selection among the signal arrival phases. The system can repeat this operation at each point along the receiver path and for each point of interest, such as a cell, within the space of interest.

It must be noted with respect to the above that the propagation path from any given point of interest to the receiver will differ from point to point along the receiver path, as will the relative phase of the signal components from that point. In addition, the set of signal emitting points traversed by the propagation path from that point to the receiver will vary from point to point along the receiver path. The set of signal components arriving from signal emitting points intersected by that propagation path line will thereby also change from point to point along the receiver path, with the exception of the signal components from the selected point of interest, thereby allowing the signal components from each point of interest to be uniquely identified and extracted by integration along the receiver path.

Therefore considering focused synthetic aperture imaging method, in this method a measurement aperture is generated by motion of a receiving aperture along a path, the receiver path, and phase gradient measurements are taken continuously and incrementally at a sequence of measurement points across the measurement aperture. The location of a signal emitter within the computational domain, that is, the location of a cell along a propagation path of the transmitted signal, may be determined by coherently measuring the phase gradient of the signal or signal components emitted by that signal emitter at a plurality of measurement points across the measurement aperture wherein each phase gradient measurement includes an amplitude and a phase gradient of the received signal at the measurement point. Coherent, time integrated measurement of received signal wavefront phase differences for a given point, or cell, is related to a corresponding vector wherein each vector has a direction from the measurement point to the signal emitter point and an amplitude proportional to the received signal at the measurement point, thereby indicating the line of a propagation path to one or more signal emitting points. As discussed above with respect to Doppler/phase methods, the signal components from a given point or cell within the space of interest can be identified and extracted by identifying the propagation path from each receiver path point to the point of interest and the corresponding phase gradient, and identifying and extracting the signal components having the corresponding phase gradient.

What is claimed is:

1. A method for imaging the interior elements of a structure, comprising the steps of:
    transmitting a narrow band signal through the structure,
    receiving the narrow band signal through a narrow band receiver over a range of signal paths extending from the transmitter and through the structure, and
    imaging the interior elements of the structure according to the effects of the interior elements on the electric and magnetic field components of the received signal over the range of signal paths.

2. The method for imaging the interior elements of a structure, wherein:
    the electric and magnetic components of the received signal are measured by one of Doppler and focused synthetic aperture methods.

* * * * *